US009103676B2

(12) United States Patent
Bergh

(10) Patent No.: US 9,103,676 B2
(45) Date of Patent: Aug. 11, 2015

(54) INTERFEROMETER EMPLOYING A MULTI-WAVEGUIDE OPTICAL LOOP PATH AND FIBER OPTIC ROTATION RATE SENSOR EMPLOYING SAME

(71) Applicant: Ralph A. Bergh, Lititz, PA (US)

(72) Inventor: Ralph A. Bergh, Lititz, PA (US)

( * ) Notice: Subject to any disclaimer, the term of this patent is extended or adjusted under 35 U.S.C. 154(b) by 197 days.

(21) Appl. No.: 13/950,637

(22) Filed: Jul. 25, 2013

(65) Prior Publication Data
US 2014/0218739 A1 Aug. 7, 2014

Related U.S. Application Data

(62) Division of application No. 12/867,564, filed as application No. PCT/US2009/034140 on Feb. 13, 2009, now Pat. No. 8,497,994.

(60) Provisional application No. 61/028,688, filed on Feb. 14, 2008.

(51) Int. Cl.
*G01C 19/72* (2006.01)
*G01C 19/64* (2006.01)
*G01B 9/02* (2006.01)

(52) U.S. Cl.
CPC .............. *G01C 19/64* (2013.01); *G01B 9/0209* (2013.01); *G01B 9/02049* (2013.01); *G01C 19/72* (2013.01)

(58) Field of Classification Search
CPC ............ G01C 9/64; G01C 9/72; G01C 9/662; G01C 9/68; G01B 9/02049; G01B 9/0209; G02B 6/02042
USPC .......................................................... 356/460
See application file for complete search history.

(56) References Cited

U.S. PATENT DOCUMENTS

| 4,299,490 | A | * | 11/1981 | Cahill et al. .................. 356/464 |
| 4,634,282 | A | | 1/1987 | Shaw et al. |
| 4,671,658 | A | * | 6/1987 | Shaw et al. .................. 356/460 |
| 4,702,600 | A | | 10/1987 | Handrich et al. |
| 4,869,592 | A | | 9/1989 | Bergh |
| 5,074,665 | A | | 12/1991 | Huang et al. |
| 5,141,316 | A | | 8/1992 | Lefevre et al. |

(Continued)

FOREIGN PATENT DOCUMENTS

| WO | WO0216985 A1 | 2/2002 |
| WO | WO2007143369 A1 | 12/2007 |
| WO | WO/2012/008955 | 1/2012 |

OTHER PUBLICATIONS

Herve Lefever, "The Fiber-Optice Gyroscope," Artech House (1992).
(Continued)

*Primary Examiner* — Tarifur Chowdhury
*Assistant Examiner* — Jonathon Cook
(74) *Attorney, Agent, or Firm* — George A. Leone; Citadel Patent Law

(57) ABSTRACT

An interferometer employed, in part, as a Sagnac interferometer or fiber optic gyro (FOG) includes a light source that provides a source light wave that is split into first and second light waves that are directed to traverse a defined optical loop path in opposite directions. The defined optical loop path in accordance with the present invention is provided by multiple waveguides wound into a coil such that the opposite traveling first and second light waves serially travel through all of the waveguides in opposite directions around the optical loop path.

15 Claims, 5 Drawing Sheets

(56) References Cited

U.S. PATENT DOCUMENTS

| | | | |
|---|---|---|---|
| 5,150,956 A | | 9/1992 | Buhler et al. |
| 5,181,078 A | | 1/1993 | Lefevre et al. |
| 5,485,274 A | | 1/1996 | Kemmler |
| 5,854,678 A | | 12/1998 | Liu et al. |
| 5,926,275 A | * | 7/1999 | Sanders et al. ............... 356/464 |
| 7,167,250 B2 | | 1/2007 | Chen et al. |
| 7,505,139 B2 | * | 3/2009 | Bergh ........................... 356/464 |
| 8,497,994 B2 | | 7/2013 | Bergh |
| 8,610,995 B2 | | 12/2013 | Bergh |
| 2002/0146226 A1 | | 10/2002 | Davis et al. |
| 2003/0202187 A1 | * | 10/2003 | Lange et al. ................. 356/464 |
| 2008/0094636 A1 | | 4/2008 | Jin et al. |
| 2008/0218765 A1 | | 9/2008 | Bergh |

OTHER PUBLICATIONS

"Optical Fiber Rotation Sensing," Edited by William K. Burns, Academic Press (1993).
International Search Report, International App. No. PCT/US2010/041949, Mar. 23, 2011.
Written Opinion of the International Searching Authority, International App. No. PCT/US2010/041949, Mar. 23, 2011.
International Preliminary Report on Patentability, International App. No. PCT/US2010/041949, Jan. 15, 2013.
Initiated Interview Summary, U.S. Appl. No. 12/867,564, Apr. 3, 2013.
Notice of Allowance, U.S. Appl. No. 12/867,564, Apr. 3, 2013.
International Preliminary Report on Patentability, Aug. 17, 2010.
International Search Report, Aug. 31, 2009.

* cited by examiner

INTERFEROMETER EMPLOYING A MULTI-WAVEGUIDE OPTICAL LOOP PATH AND FIBER OPTIC ROTATION RATE SENSOR EMPLOYING SAME

CROSS-REFERENCE TO RELATED APPLICATIONS

This application is a divisional application of co-pending application Ser. No. 12/867,564, filed Nov. 5, 2010, which was a 371 national entry of prior PCT application PCT/US09/34140, filed Feb. 13, 2009, which, in turn was a non-provisional application of expired provisional application 61/028,688, filed Feb. 14, 2008. This application claims priority of the afore-listed applications and all of the afore-listed applications are incorporated by reference.

FIELD OF THE INVENTION

The present invention relates, in general, to a Sagnac Interferometer, and more particularly one that is useful in a fiber optic rotation rate sensor, commonly referred to as a fiber optic gyroscope (FOG), employing a wound coil of many turns of a continuous optical fiber, defining an optical loop path, for passing a light wave therethrough.

BACKGROUND OF THE PRESENT INVENTION

The heart of the fiber optic rotation rate senor or gyroscope (hereafter, simply FOG) is well known in the art is the Sagnac interferometer, briefly illustrated in FIG. 1. The Sagnac interferometer in its simplest form consists of a single directional coupler 108, e.g. a beam splitter, and an optical path that in our case amounts to a length of optical fiber formed into a loop 20, 1 turn or multiple turns, respectively. The directional coupler 108 is used to split an impinging light wave derived from a light source 100 into two waves, but it can also be used to combine two waves, or in other words, interfere two waves. The directional coupler in a Sagnac interferometer will do both. After the directional coupler 108 splits the light wave, the resulting two waves enter opposite ends of the optical fiber loop 20 and propagate in opposite directions through the optical fiber loop 20, pass through each other, emerge from the fiber, and are combined by the same directional coupler 108. The optical power of the combined waves depends upon the phase difference between the two interfering waves. The phase shift is related to the rotation rate of the fiber loop according to the Sagnac effect, and can be expressed as, $$\Delta\phi = \frac{2\pi LD}{\lambda c}\Omega$$

where L is the length of the fiber in the loop, D is the diameter of the loop, $\lambda$ and c are the wavelength and speed of the light in vacuum, respectively. The diameter D of the loop is usually constrained by the application, and is typically between 1 and 6 inches. Winding the optical fiber (hereafter referred to as simply fiber) into a multiturn coil can increase the length of fiber, L, while maintaining a manageable diameter D. Typical lengths are between 0.05 and 5 km. The packaging volume, of course, imposes a limit on the length of the coil of optical fiber. The outside diameter (OD) and the height of the fiber coil are generally limited by the space allocated by the system designer. The fiber length is limited by the number of turns of fiber that will fit on each layer and the number of layers that will fit in the package. The outside layer will provide the most signal because it has the largest diameter as well as the largest length of fiber per layer. Each successive inner layer becomes smaller in both diameter and fiber length per layer. Reducing the fiber diameter increases the length of fiber that will fit into the space allotted, but the fiber becomes more delicate and increasingly difficult to wind accurately as the size is reduced. Accurate winding helps to ensure tight packing of the fiber, and is intended to reduce sensitivity to environmental changes such as temperature and pressure, as is well known.

Operation of the FOG is based on the Sagnac effect as aforesaid. The way that the FOG enhances the sensitivity to rotation is via increasing the total phase shift between the counter-propagating waves by making them follow a long fiber path—typical gyro fiber lengths are 50 meters to a few kilometers. The basic FOG architecture as illustrated in FIG. 1 is called the "minimum" or "reciprocal" configuration. This has been the optical architecture of choice for all medium- and high-accuracy fiber optic gyroscopes since the 1980s (Ulrich 1980). The reason is that the clockwise and counter-clockwise waves traverse almost identical paths so that common-mode errors tend to cancel each other. Soon after Ulrich's proposal, the group led by Arditty and Lefevre in France proposed the hybrid architecture, which combines fiber components with an integrated optic Y-junction fabricated with lithium niobate waveguides (Arditty et al. 1984; Lefevre et al. 1985). In a FOG, the light from the source is split by a splitter, and the two light waves thus created enter opposite ends of an optical fiber that is wound into a coil, they pass through each other as they counter propagate through the fiber and return to the splitter where the two waves are combined, and the combined waves are directed to a detector.

A cylindrical fiber coil is often referred to in terms of its diameter, D, and the length, L, of the fiber. The phase difference between the combined waves is proportional to the LD product times the rotation rate according to the Sagnac effect. The main benefit of using an optical fiber is that L can be quite large while D can be a manageable size. Because the two waves counter-propagate through the same fiber, a tremendous error reduction is gained regarding perturbations of the fiber. This reduction is not perfect because the two waves traverse a given section of fiber at different times.

The FOG has been very successful in a limited number of applications. These include applications where the fiber coil is not subjected to large variations in temperature and where the FOG can be made quite large. In some applications with limited temperature range, where the power requirements and startup requirements allow, the fiber-optic coil is actually temperature controlled. In such cases the fiber can be made very long and the rotation-rate signal made large compared to noise to improve the rotation-rate measurement. The increased fiber length only works in benign conditions or when the temperature is controlled because errors due to environmental perturbations scale with length. Clever winding techniques have, however, reduced the impact of time varying strain gradients in the coil, but further improvement is necessary for the FOG to reach its full potential.

If the FOG is designed and constructed well, its ability to accurately measure rotation rate is limited by the stability of the present state-of-the-art fiber coil as it is subjected to a changing environment. Generally, the fiber coil is a composite structure of glass and a variety of plastics including adhesive to hold it together. The signal in the FOG increases with the diameter of the coil and also with the number of turns of fiber in the coil. Increasing the diameter of the coil has the obvious problem of increasing the size of the FOG. The diameter of the coil is made to be as large as is acceptable in the application for which the FOG is intended. Increasing the number of turns of fiber also increases the size of the coil, and it reduces the coil stability. Adding more turns either means increasing the axial dimension of the coil or adding more layers of fiber. The plastic in the coil expands with temperature much faster than the glass fiber. The result is that the plastic strains the fiber in a way that varies from layer to layer. This causes a time-varying strain gradient if the temperature is varying in time, and thereby causes a measurement error. In some cases the error can be measured and compensated for to some extent; in other cases. It is not easy to distinguish the error from rotation-rate measurement, and it is not possible to compensate for the error.

FOG Basics

FOGs have been extensively developed over the past 30 years and have demonstrated tremendous performance. The basic design of the fiber gyroscope is well documented elsewhere [Shaw; Lefreve; Bergh] and we will not give a complete tutorial here except to mention that it is very important to make use of the 30 years of development to reduce errors. In particular the design must adequately address many topics including: amongst others:
a) Reciprocity, that requires the use of a single mode filter at the input/output port of the interferometer and proper optical polarization management;
b) Rayleigh backscattering from the glass in the optical fiber; and back reflections from other sources such as fiber ends and coupling points;
c) Optical Kerr effect due to the nonlinear nature of the optical fiber;
d) Coherence of light throughout the gyroscope;
e) Time varying gradients of temperature and strain within the fiber coil and various fiber pigtails;
f) Signal processing electronics including a dual closed-loop technique to derive feedback modulation for the purposes of accurately compensating for the Sagnac phase difference and for performing a real-time calibration of the electronics and the phase modulator.

A schematic of an example of a high quality FOG is shown in FIG. 1, as earlier described. The interferometer portion consists of a multiturn fiber coil 150 that forms, in part, an optical loop 20, a phase modulator 112, and a directional coupler 108. Light enters and exits the interferometer through a single-mode single-polarization filter 106 and fiber 126. The light is delivered from a source 100, and to a detector 102, through a second directional coupler, dc2, 104. In some cases a circulator is used in place of the dc2 to increase optical power at the detector. Signal processing electronics 114 receives the detected signal and derives a feedback signal to control the phase difference between the two waves exiting the interferometer. The signal processing electronics 114 also determines the rotation rate of the gyroscope and produces the measurement output, 116.

The light source is typically an amplified stimulated emission (ASE) source. Often a polarizer 106, directional coupler 108, and phase modulator 112 are combined in one device called a multifunction chip. A fiber coil generally provides the optical path and typically consists of about 1000 to 10,000 turns of fiber. The phase difference due to rotation is thus increased 1000 to 10,000-fold, respectively.

As is well understood, improved performance in FOGs is gained by increasing the total length of fiber used in the gyro and the diameter of the fiber-optic coil. The quest for ever larger signal can result in very large diameter FOGs that become challenging to package and to stabilize in a dynamic environment.

It is therefore an object of the present invention to therefore provide a FOG with an improved fiber coil with improved performance with no increase in size.

Another object of the present invention is to provide an improved Sagnac interferometer with improved performance with no increase in size.

BRIEF SUMMARY OF THE INVENTION

In accordance with one embodiment of the present invention, a Sagnac interferometer employed, in part, as a fiber optic gyro or FOG includes a light source that provides a source light wave that is split into first and second light waves that are directed to traverse a defined optical loop path in opposite directions. The defined optical loop path in accordance with the present invention is provided by a fiber coil consisting of a fiber having many turns of an optical fiber having 2 or more waveguides or optical cores, each having first and second terminating ends. Further, the fiber coil is optically configured such that (i) a first light wave travels in a first direction through the fiber coil along an optical loop path via entering at a first terminating end of a first waveguide, through each of the remaining waveguides, and exiting from the second end of a designated last waveguide, and (ii) a second light wave travels through the fiber coil in an opposite direction and along the same optical loop path as said first light wave, via entering said fiber coil at the second end of the designated last waveguide, through each of the remaining waveguides, and exiting from said first end of said first waveguide. In turn, the exiting light waves from the fiber coil, having traversed the same optical path in opposite directions, are directed to interfere in order to determine any rotation rate induced Sagnac phase shift as is well known and understood.

In accordance with another embodiment of the present invention, the aforesaid optical loop path of the FOG or Sagnac interferometer is constructed from a grouping of a plurality of waveguides into a bundle that is wound into a coil. The bundle is then optically configured such that (i) a first light wave entering at a first end of a first waveguide of the bundle will travel in one direction through the fiber coil, through each of the remaining waveguides, and exit from an exit end of a designated exit waveguide, and (ii) a second light wave through the bundle of waveguides in an opposite direction and along the same optical loop path as said first light wave, via entering at the exit end of the designated exit waveguide of the bundle, through the remaining waveguides of the waveguide bundle, and exiting from the first end of the first waveguide. In turn, the exiting light waves from the waveguide bundle are directed to interfere in order to determine any rotation rate induced Sagnac phase shift as is also well known and understood. Since each waveguide of the bundle has first and opposite second ends, the waveguides are optically coupled to each other such that light will be transferred between the second end of the first waveguide and the first end of a second waveguide; and between the second end of the second waveguide and the first end of a third waveguide; and so on until light is transferred between the second end of a next to last waveguide and the first end of the last remaining waveguide. Light will be transferred into and out of the coil of the waveguide bundle through, or near, the first end of the first waveguide and the exit end of the designated exit waveguide.

In accordance with the embodiments as just described, the innovative FOG architecture employing the novel optical fiber coil construction of multiple waveguides will increase the Sagnac phase difference in a FOG while reducing the physical length of the multi-waveguide fiber in the fiber coil. Reducing the fiber length of the fiber coil results in a smaller size coil and improved thermal performance characteristics. Further, using multiple fiber cores or waveguides or bundle of waveguides increases the Sagnac phase difference for a given length of fiber by a factor equal to the number of cores or waveguides.

DETAILED DESCRIPTION OF THE INVENTION

Figure 1:
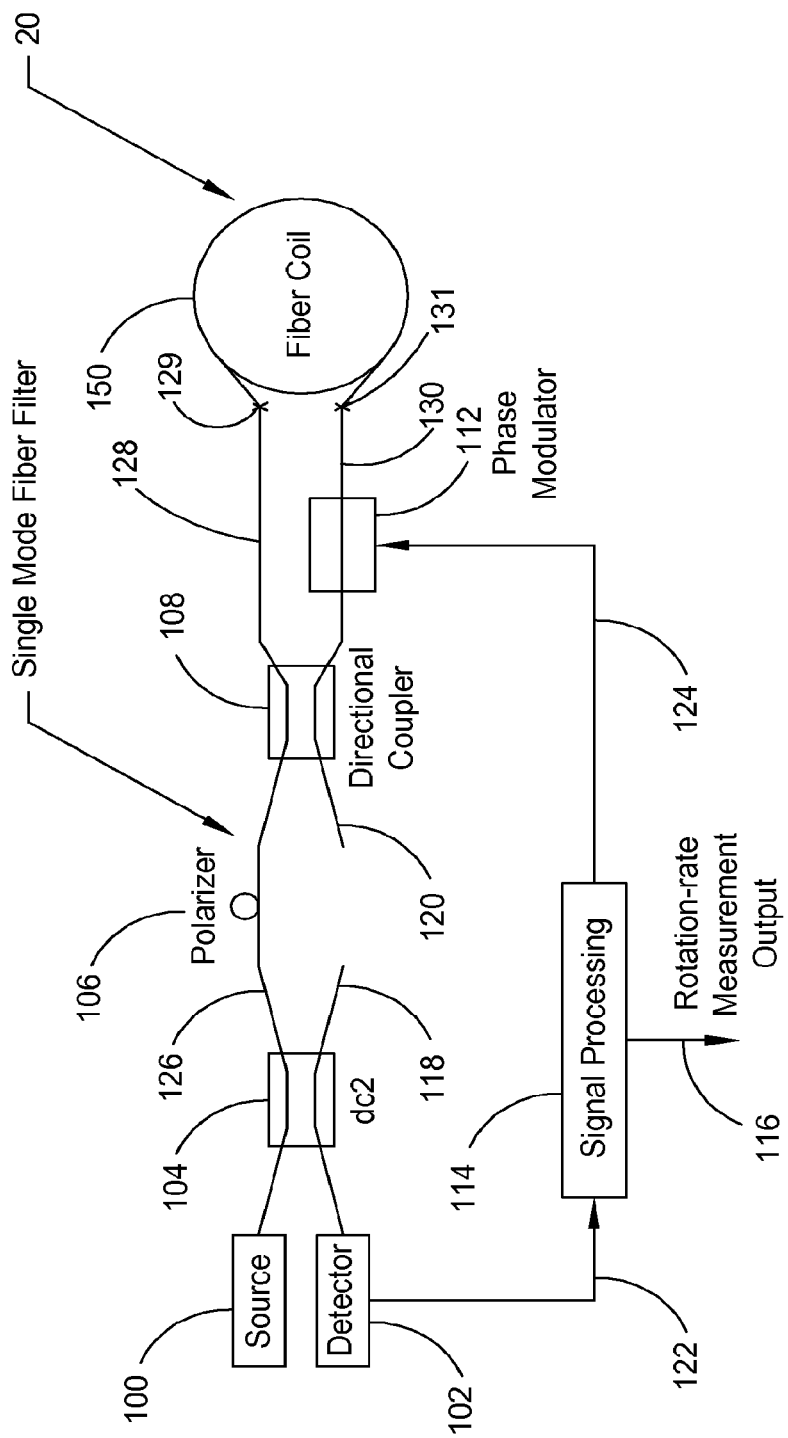
FIG. 1 is a schematic block diagram of a fiber optic gyroscope (FOG) well known in the art employing the principles of the basic Sagnac interferometer.

A general block diagram of a FOG known in the prior art is depicted in FIG. 1 as aforedescribed in the Background. As is common in fiber optic rate sensors, a light source 100 provides a source light wave that is passed through a directional coupler 104, polarizer 106 via a single mode fiber 126, and a second directional coupler 108 that splits the impinging source light wave into (i) a first light wave that enters a first end 129 of a single mode fiber that is wound into a fiber coil 150 via fiber 128, and (ii) a second light wave that passes through a phase modulator 112 and fiber 130 before entering the second end 131 of the single mode fiber that is wound into the fiber coil 150.

The first and second light waves, having traversed the same exact optical path of the single mode fiber or single waveguide of the fiber coil 150, are again passed through the directional couple 108, polarizer 106, and directional coupler 104, where a portion of each of the light waves is directed to impinge upon a light detector where they interfere. In turn, the detector provides an output signal for signal processing 114 from which signals are derived for providing an indication of rotation rate, as well as for proving a signal utilized for phase modulating the first and second waves to assist in the overall signal processing as is well known. It should be understood, herein, that there are a wide variety of signal processing techniques that may be employed in practice of the present invention, all of which are intended to be within the true spirit and scope of the present invention and will not be described further herein.

Figure 2:
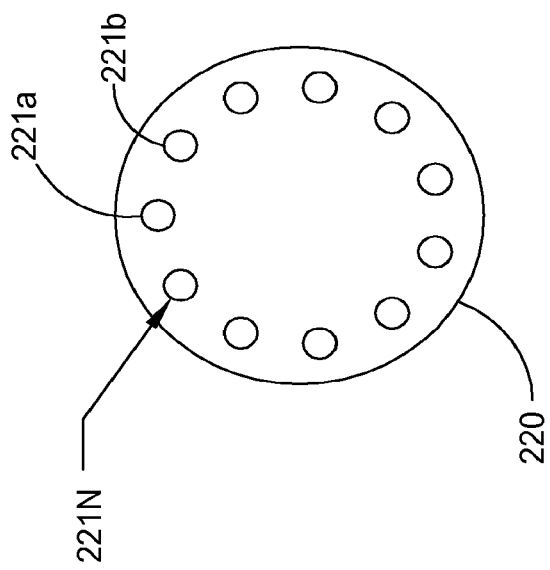
FIG. 2 is a scaled version of a cross-section of both a standard single-mode fiber (left) and a cross-section of a multicore fiber (right).
Figure 2:
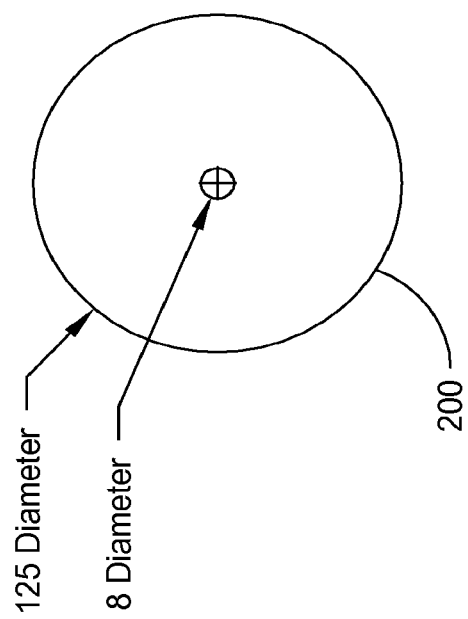

In FIG. 2, there shown is a cross-section of a single mode optical fiber 200 (on the left) that is commonly employed in providing fiber coil 150. As illustrated by way of example, fiber 200 is a scaled version of a fiber with a 125-micrometer diameter and an 8-micrometer core. To use this type of fiber, polarization management requires the use of depolarization within the fiber coil. Commonly, a broadband source such as a fiber ASE source and Lyot depolarizers are employed. Great strides have been made in depolarization in FOG technology. In this type of fiber 200, the guided optical mode extends only a short distance outside of the core of the fiber. The light thus occupies a small fraction of the glass of the fiber. This extra glass is there to make the fiber easier to handle. In addition, the typical telecommunications fiber is also coated with an acrylate jacket that doubles its size as is well known.

As is also well know in the art of FOGs, the coil may be wound in manner utilizing techniques to minimize stress and strain on the optical fiber by such as, e. g., a designated winding pattern as the coil is constructed. These and other coil winding techniques, too, are all within the true spirit and scope of the present invention and will not be described herein.

In accordance with the present invention, the FOG, more specifically the Sagnac interferometer, is constructed having an optical loop path that is defined by a bundle of waveguides that may be implemented by way of a multicore waveguide or the like. In the following exposition, first a common single mode optical fiber will be illustrated along with a multicore fiber (FIGS. 2-4), and several examples thereof. In turn, FOG architecture employing a multicore fiber or wave guide bundle optical loop path will be described with reference to FIGS. 5 and 6, and their relation to the prior art FOG architecture already described with reference to FIG. 1.

Again referring to FIG. 2, thereshown is a cross-section of a multicore or multi-waveguide optical fiber 220 having 11 fiber cores providing multiple optical waveguides. In FIG. 2, optical fiber 220 is illustrated as having 11 cores numerically designated as 221a, 221b . . . and 221N that are evenly distributed. Multicore Fiber 220 has many similarities to the standard single-core fiber 200. The outside diameter is still 125 micrometers, and each of the 11 cores has a diameter of 8 micrometers. These 11 waveguides are also single mode. Again, depolarization will be required, as these waveguides are not designed to maintain the input state-of-polarization. It should be noted that the aforesaid dimensions are only exemplary.

Figure 3:
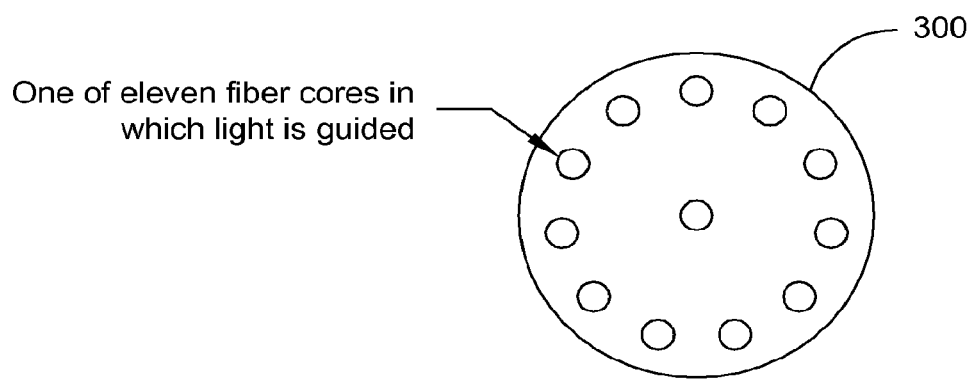
FIG. 3 is a scaled version of a cross-section of a multicore fiber having 10 concentric cores and a center core.

FIG. 3 illustrates yet another example of a multicore optical fiber 300. Thereshown, the center waveguide can be made to have a similar propagation constant to the side waveguides to make an efficient coupler from a side to center waveguide for coupling in and out of the fiber optical loop path. It can then be spliced to standard single-mode fiber to transfer light from the center waveguide in the multicore fiber to the only waveguide in the standard single-mode fiber.

It should be noted, that the cross-sectional geometry of multicore fibers for FOG applications may be optimized using simulations to determine practical limits on the number of cores and their optimum positions. Available multicore fibers consisting of a two-core fiber are readily available from fiber manufacturers. Multicore fiber may be fabricated by manufacturers such as Polymicro, Corning, OFS, Stocker-Yale or Verrillon for the fabrication of fibers with four or more cores. One example of a multicore optical fiber is disclosed in U.S. Pat. No. 6,301,420, entitled, "Multicore Optical Fibre", issued to Greenaway, et. al.

It should be further noted that multicore fiber for sensors applications has been receiving increasing attention. For example, France Telecom [Bethuys et al., 1998] has provided multicore fiber for Fiber Bragg Grating (FBG) based bend sensor applications [Cranch et al, (NRL) 2006; Flockhart et al., 2003]. Dr. Bob Rogowski's group at NASA Langley Research Center has produced multicore fiber 400, shown in FIG. 4, by inserting Ge-doped rod into holes drilled in a silica preform before the fiber was drawn [Fender et al.]. Applicant had been already working with samples of multicore fiber from NASA Langely Research Center.

As indicated earlier, a multi-waveguide fiber coil maybe constructed by way of wide variety of winding techniques that may improve FOG performance characteristics, more or less. Different winding patterns, as aforesaid may include, among others, quadrapole, hexadecapole, and interleave, all of which are intended to be within the scope of the present invention.

Gyro Architecture

Figure 5:
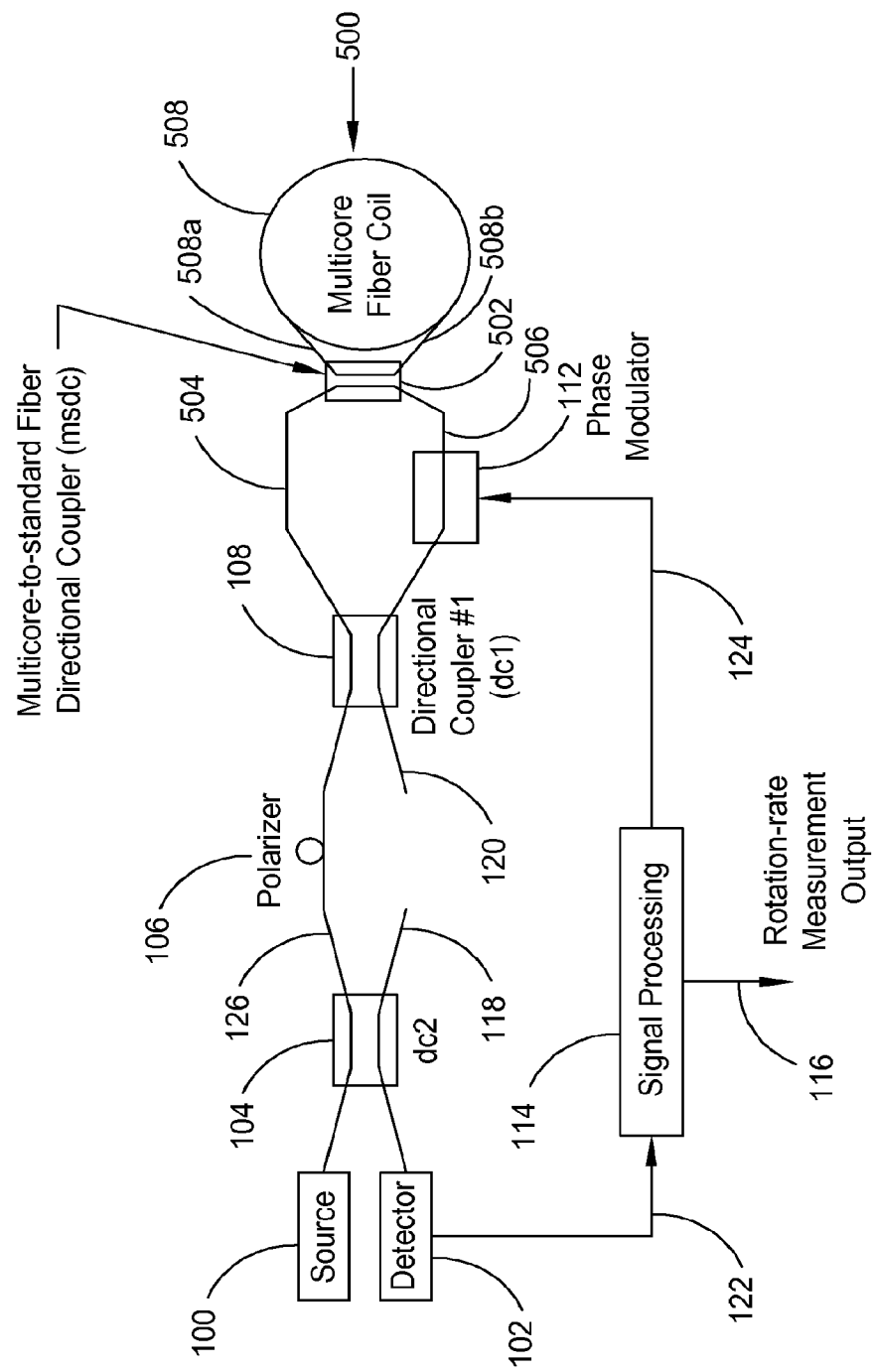
FIG. 5 is a schematic block diagram of a FOG employing a multicore fiber coil in accordance with the present invention.

Illustrated in FIG. 5 is a schematic block diagram of a FOG architecture differing somewhat to that shown in FIG. 1 to take advantage of a multi-waveguide fiber that make up a fiber coil in accordance with the present invention. In FIG. 5, like components having similar function as those in FIG. 1 have retained the same numeral designation. In particular, a multicore fiber 508 providing multiple waveguides is utilized for the construction of the fiber coil 500. Further, a Multicore-to-standard Fiber Directional Couple 502 (msdc 502) is employed for coupling light waves into and out of fiber coil 500.

As illustrated, the pair of light waves emanating from the splitter 108 is coupled to the multicore fiber 508 through standard fibers 504 and 506. The msdc 502, in turn couples light into and out of fiber coil from fiber ends 508a and 508b.

Figure 4:
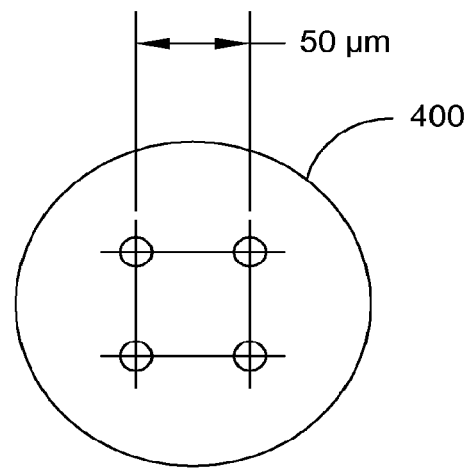
FIG. 4 is another scaled version of a cross-section of a multicore fiber having 4 cores symmetrically arranged at the corners of a square equidistant from the center of the fiber.

As further illustrated in FIG. 5, a multicore fiber 508, similar to those illustrated in FIGS. 2-4, provides fiber coil 500 that provides multiple waveguides as already described. Appropriate splicing of the fiber cores of the multicore fiber 508 will be optically configured into an optical loop path with optical core splicing that ensures that light that is introduced into one of the waveguides will pass through all of the waveguides near the perimeter of the fiber (in the case of a fiber like that shown in FIG. 3) before returning to the spatial point of introduction. In the case of a prime number of waveguides near the perimeter, as in our 11-core example of FIG. 3, it is only necessary to have a given core lined up with any core other than itself to insure that all cores will be used. To introduce the light, side polished couplers may used. Preferably, the optical structure and configuration is constructed such that light does not recirculate in the optical loop path, but makes a singe pass through all the cores.

Figure 6:
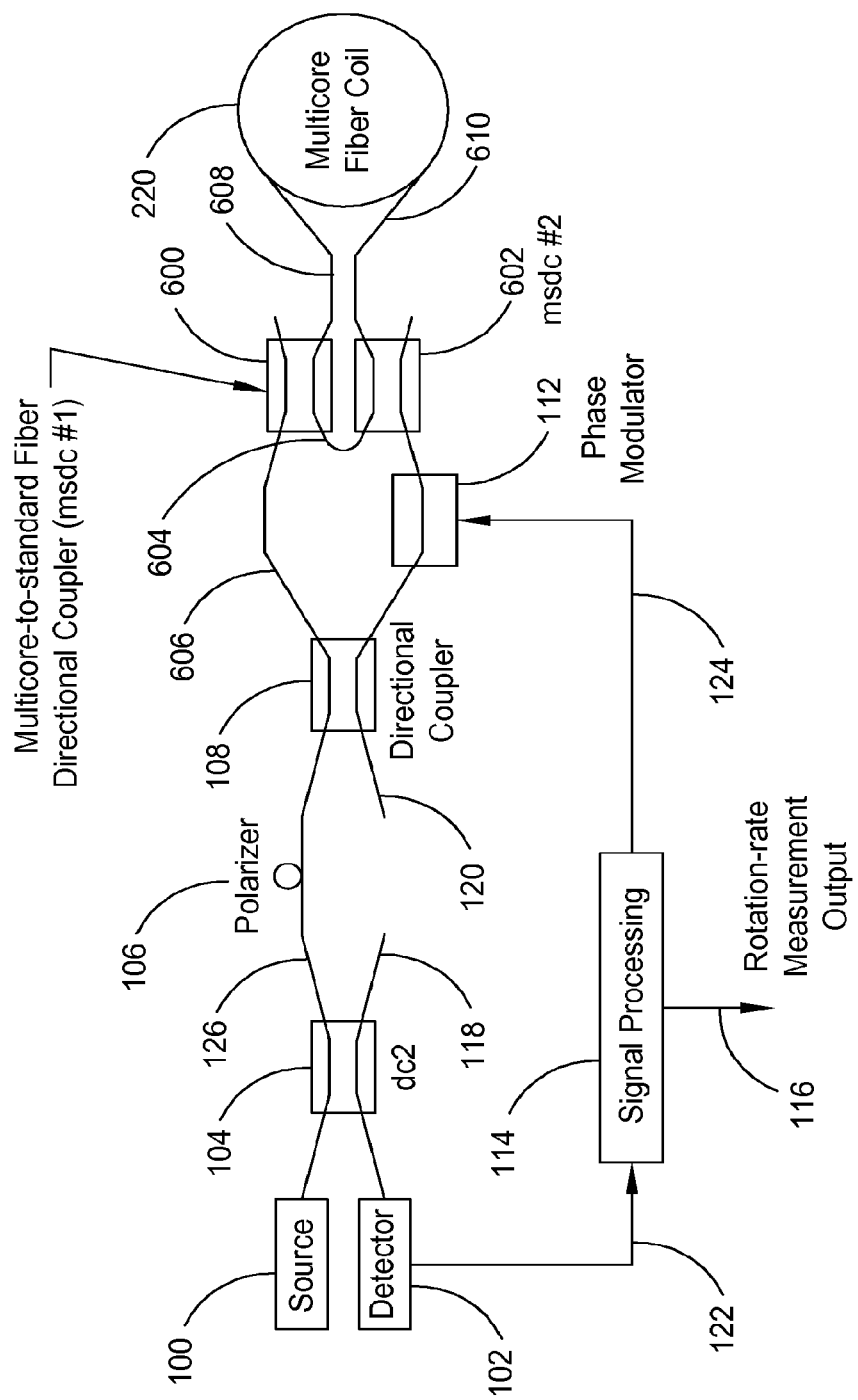
FIG. 6 is a schematic block diagram of a FOG employing a multicore fiber coil in accordance with another embodiment of the present invention.

In FIG. 5, a multicore-to-standard fiber ideally will couple 100 percent of the light from a standard sing mode fiber, say fibers 504 and 506, to one of the multicore fiber waveguides, and 100 percent back again. It is quite likely in reality that the coupling will not be complete. In this case the design as illustrated in FIG. 6 may be more suitable.

In one embodiment of the invention as that illustrated in FIG. 5, consider by way of example, an optical loop path provided by way of an optical fiber having 11 cores, i.e., N=11. After light propagates around the fiber coil through one of the cores, it is then coupled, back at the entry point, to a second core to propagate around the fiber coil again via multicore direction coupler 502. The light will then be coupled through a third core, and so on, until it has propagated through all N cores (N times through the fiber) and emerges from the coil. The result will be a Sagnac phase difference between interfering waves that is N times what it would be for a standard fiber with a single core. This signal improvement is accomplished without making the fiber longer, but by more efficient use of the space within the fiber. More signal is achieved for the same size fiber coil. Or alternatively, the signal size is increased even while the length of fiber in the coil, and thus the size of the coil, is reduced. In our example, the Sagnac phase difference is 11 times larger than it would be in a single core fiber.

Small and accurately wound fiber coils take better advantage of the natural common mode rejection afforded by the Sagnac interferometer. In a Sagnac interferometer, two waves are compared after they propagate in opposite directions along the same optical path. Changes in the fiber affect both waves but at slightly different times. Accurately winding the fiber in the coil is intended to bring part of the fiber on one side of the fiber loop into close proximity to a part of the fiber on the other side of the fiber loop that is equidistant from the loop coupler. Any perturbation that occurs on one side will likely occur on the other, and both of the counter-propagating waves will then experience the same perturbation at the same time and no spurious phase difference will occur when the waves interfere. This common mode rejection works to some extent. Unfortunately the perturbation of one fiber is not exactly the same as the neighboring fiber regardless of how accurately the fiber is wound. Additionally, it would help if the time difference between the passings of the two counter-propagating waves could be reduced.

In a multicore fiber coil the error-inducing time difference is reduced by an order of magnitude. The two counter-propagating waves pass through the same section of fiber with a time difference that is at most equal to one transit time around the fiber. This is shorter than the time for a single core fiber because the fiber in the coil is shorter for a given Sagnac phase shift by a factor of N, where N is the number of cores within the fiber.

In FIG. 6, thereshown is a schematic block diagram of a FOG architecture differing somewhat to that shown in FIG. 5 to take advantage of a multicore fiber or multi-waveguide bundle that make up a fiber coil in accordance with the present invention. In FIG. 6, like components having similar function as those in FIG. 5 have retained the same numeral designation.

In FIG. 6, msdc 502 of FIG. 5 is replaced with a pair of Multicore-to-standard Fiber Directional Couplers, msdc couplers 600 and 602. Msdc coupler 600 and msdc couple 602 are also ideally 100 percent, but the possibility of light returning to the polarizer 106 without making at least one pass through the 11 cores, in the example, of the multicore fiber coil is significantly reduced.

As is well understood by those skilled in the art of the Sagnac Interferometers, and FOGs in particular, it is of paramount importance that the counter-propagating light waves that traverse the optical loop path follow exactly the same optical loop path, but in opposite directions.

Accordingly, as indicated earlier, in accordance with the present invention, a Sagnac interferometer employed, in part, as a FOG includes a light source that provides a light wave that is split into first and second light waves that are directed to traverse a defined optical loop path in opposite directions. The defined optical loop path in accordance with the present invention is provided by a fiber coil consisting of a fiber having many turns of an optical fiber having two (2) or more waveguides or optical cores. Further, the fiber coil is optically configured such that (i) a first light wave travels in a first direction through the fiber coil along an optical loop path via entering at a first end of a first waveguide, through each of the remaining waveguides, and exiting from an exit end of a designated exit waveguide, and (ii) a second light wave travels through the fiber coil in an opposite direction and along the same optical loop path as said first light wave, via entering said fiber coil at said designated exit waveguide exit end, through each of the remaining waveguides, and exiting from said first end of said first waveguide. In turn, the exiting light waves from the fiber coil, having traversed the same optical path in opposite directions, are directed to interfere in order to determine any rotation rate induced Sagnac phase shift as is well known and understood.

In accordance with another embodiment of the present invention, the aforesaid optical loop path of the FOG or Sagnac interferometer is constructed from a grouping of a plurality of waveguides into a bundle that is wound into a coil. The bundle is then optically configured such that (i) a first light wave entering at a first end of a first waveguide of the bundle will travel in one direction through the fiber coil, through each of the remaining waveguides, and exit from an exit end of a designated exit waveguide, and (ii) a second light wave travels through the bundle of waveguides in an opposite direction and along the same optical loop path as said first light wave, via entering at the exit end of the designated exit waveguide of the bundle, through remaining waveguides of the waveguide bundle, and exiting from the first end of the first waveguide. In turn, the exiting light waves from the waveguide bundle are directed to interfere in order to determine any rotation rate induced Sagnac phase shift as is also well known and understood. Since each waveguide of the bundle has a first and second end, the waveguides are optically coupled to each other such that light will be transferred between the second end of the first waveguide and the first end of a second waveguide; and between the second end of the second waveguide and the first end of a third waveguide; and so on until light is transferred between the second end of a next to last waveguide and the first end of the exit or last waveguide. Light will be transferred into and out of the coil of the waveguide bundle through, or near, the first end of the first waveguide and the exit end of the designated exit waveguide.

Thus, the multiple waveguide optical loop path of the interferometer maybe provided by wide array of multicore fiber configurations as exemplified in FIGS. 2-4, and alternatively by way of a bundle of optical waveguides that may be facilitated and manufactured to form a fiber coil using proper optical waveguide handling techniques, all of which are intended to be within the true spirit and scope of the present invention.

Now consider the exemplary light path in the multi-waveguide fiber or bundle where a fiber has 11 (N=11) waveguides or cores. After light propagates around the fiber coil through one of the cores, it is then coupled, back at the entry point, to a second core to propagate around the fiber coil again. The light will then be coupled through a third core, and so on, until it has propagated through all N cores (N times through the fiber) and emerges from the coil. The result will be a Sagnac phase difference between interfering waves that is N times what it would be for a standard fiber with a single core. This signal improvement is accomplished without making the fiber longer, but by more efficient use of the space within the fiber. More signal is achieved for the same size fiber coil. Or alternatively the signal size is increased even while the length of fiber in the coil, and thus the size of the coil, is reduced. In our example, the Sagnac phase difference is 11 times larger than it would be in a single core fiber.

Small and accurately wound fiber coils take better advantage of the natural common mode rejection afforded by the Sagnac interferometer. In a Sagnac interferometer, two waves are compared after they propagate in opposite directions along the same optical path. Changes in the fiber affect both waves but at slightly different times. Accurately winding the fiber in the coil is intended to bring part of the fiber on one side of the fiber loop into close proximity to a part of the fiber on the other side of the fiber loop that is equidistant from the loop coupler. Any perturbation that occurs on one side will likely occur on the other, and both of the counter-propagating waves will then experience the same perturbation at the same and no spurious phase difference will occur when the waves interfere. This common mode rejection works to some extent. Unfortunately the perturbation of one fiber is not exactly the same as the neighboring fiber regardless of how accurately the fiber is wound. Additionally, it would help if the time difference between the passings of the two opposite traveling light waves could be reduced.

In a multicore fiber coil the error-inducing time difference is reduced by an order of magnitude. The two counter-propagating waves pass through the same section of fiber with a time difference that is at most equal to one transit time around the fiber. This is shorter than the time for a single core fiber because the fiber in the coil is shorter for a given Sagnac phase shift by a factor of N, where N is the number of cores within the fiber.

It shall be noted that there is a wide array of optical splicing techniques, well known in the art, to facilitated coupling of the primary split waves that counter-propagate through the optical loop path. The FOG architecture employing one or more multicore-to-standard fiber directional couplers maybe utilized as desired depending upon, of course, desired performance outcomes. Each of these alternative embodiments are, of course, all intended to be within the true spirit and scope of the present invention, and well known to the artisan.

Lastly, the optical loop path of Sagnac Interferometer using a multimode or multicore or multi-waveguide architecture may be employed in a wide array of sensor applications, including among others, current and voltage sensors, all of which are intended to be within the true spirit and scope of the present invention.

I claim:

1. A fiber optic interferometer comprising:
   a light source that provides a source light wave;
   a light wave splitter that splits said source light wave into first and second light waves; and
   optical means for introducing said first and second light waves to travel along an optical loop path and exit therefrom, where,
   said optical loop path is constructed by two or more optical waveguides that form a loop of one or more turns about a reference axis passing therethrough,
   wherein said two or more optical waveguides each have respective first and second terminating ends, and
   said first and second terminating ends of said waveguides are selectively optically coupled to each other such that said first and second light waves may travel in opposite directions along an identical optical loop path through each of said two or more waveguides before exiting said optical loop path.

2. The interferometer of claim 1 wherein it serves, in part, as a Sagnac interferometer rotation rate sensor, and further includes a light detector for responding to a portion of said first and second light waves exiting said optical loop path.

3. The interferometer of claim 1 wherein it serves, in part, as a fiber optic rotation rate sensor for detecting rotation of said optical loop path about said reference axis, the interferometer further including a light detector responsive to a portion of said first and second light waves exiting said optical loop path for providing an output signal indicative thereof related to the phase difference between the first and second light waves traveling along said optical closed loop path induced by rotation of said optical loop path.

4. The interferometer of claim 1 wherein said optical fiber coil is constructed from a multicore optical fiber establishing two or more optical waveguide cores, where each waveguide core has respective first and second terminating ends selectively optically coupled to each other such that said first and second light waves may travel in opposite directions along an identical optical loop path through each of said two or more waveguide cores before exiting said optical loop path.

5. The interferometer of claim 4 wherein it serves, in part, as a Sagnac interferometer rotation rate sensor, and further includes a light detector for responding to a portion of said first and second light waves exiting said optical loop path.

6. The interferometer of claim 4 wherein it serves, in part, as a fiber optic rotation rate sensor for detecting rotation of said optical loop path about said reference axis, the interferometer further including a light detector responsive to a portion of said first and second light waves exiting said optical loop path for providing an output signal indicative thereof related to the phase difference between the first and second light waves traveling said optical closed loop path induced by rotation of said optical loop path.

7. The interferometer of claim 1 further comprising:
signal processing means coupled to said optical loop for providing an output signal indicative the of rotation rate of said optical loop path about said reference axis.

8. The fiber optic rotation rate sensor of claim 7 further comprising:
optical means coupled for modulating the phase of said first and second light waves traveling along said optical loop path in response to a modulation signal; and
wherein said signal processing means provides said modulation signal and demodulates said detector output signal as a function of said modulation signal so as to derive said signal indicative of the rotation rate.

9. A fiber optic interferometer comprising:
a light source that provides a source light wave;
a light wave splitter that splits said source light wave into first and second light waves; and
optical means for introducing said first and second light waves to travel along an optical loop path and exit therefrom, wherein
said optical loop path is provided by a wound optical fiber coil that forms a loop of one or more turns about a reference axis passing therethrough, and
said optical fiber coil is a wound bundle of two or more optical waveguides that forms a loop of one or more turns about a reference axis passing therethrough, where each waveguide of said bundle has respective first and second terminating ends selectively optically coupled to each other such that said first and second light waves may travel in opposite directions along an identical optical loop path through each of said two or more waveguides before exiting said optical loop path.

10. The interferometer of claim 9 wherein it serves, in part, as a Sagnac interferometer rotation rate sensor, and further includes a light detector for responding to a portion of said first and second light waves exiting said optical loop path.

11. The interferometer of claim 9 wherein it serves, in part, as a fiber optic rotation rate sensor for detecting rotation of said optical loop path about said reference axis, the interferometer further including a light detector responsive to a portion of said first and second light waves exiting said optical loop path for providing an output signal indicative thereof related to the phase difference between the first and second light waves traveling along said optical closed loop path induced by rotation of said optical loop path.

12. An fiber optic rotation rate sensor comprising:
a light source that provides a first light wave;
a light wave splitter that splits said first light wave into a first and a second light wave; and
optical means for introducing said first and second light waves to travel along an optical loop path and exit therefrom, wherein said optical loop path is provided by a grouping of a plurality of waveguides, each having first and second ends, into a bundle that is wound into a coil, where the bundle is then optically configured such that,
(i) light waves will be transferred between the second end of the first waveguide and the first end of a second waveguide; and
(ii) between the second end of the second waveguide and the first end of a third waveguide; and so on until light is transferred between the second end of a next to last waveguide, and the first end of the last or exit waveguide, and light will be transferred into and out of the coil of the waveguide bundle through, or near, the first end of the first waveguide and the second end of the designated last or exit waveguide, where, in turn, the exiting light waves from the waveguide bundle are directed to interfere in order to determine any rotation rate induced Sagnac phase shift;
optical means for directing at least a portion of said first and second light waves exiting said optical loop path to impinge upon a detector and producing a detector output signal indicative of interfering first and second light waves impinging thereon; and
signal processing means for providing an output signal indicative the of rotation rate of said optical loop path about said reference axis.

13. The fiber optic rotation rate sensor of claim 12 further comprising:
optical means for modulating the phase of said first and second light waves traveling along said optical loop path in response to a modulation signal; and
wherein said signal processing means provides said modulation signal and demodulates said detector output signal as a function of said modulation signal so as to derive said signal indicative of the rotation rate.

14. A fiber optic rotation rate sensor comprising:
a light source that provides a source light wave;
a light wave splitter that splits said source light wave into first and second light waves;
optical means for introducing said first and second light waves to travel along an optical loop path and exit therefrom, where,
said optical loop path is constructed by two or more optical waveguides that form a loop of one or more turns about a reference axis passing therethrough,
wherein said two or more optical waveguides each have respective first and second terminating ends, and
said first and second terminating ends of said waveguides are selectively optically coupled to each other such that said first and first light waves may travel in opposite directions along an identical optical loop path through each of said two or more waveguides before exiting said optical loop path;
optical means for directing at least a portion of said first and second light waves exiting said optical loop path to impinge upon a detector and producing a detector output signal indicative of interfering first and second light waves impinging thereon; and
signal processing means for providing an output signal indicative the of rotation rate of said optical loop path about said reference axis.

15. The fiber optic rotation rate sensor of claim 14 further comprising:
   optical means for modulating the phase of said first and second light waves traveling along said optical loop path in response to a modulation signal; and
   wherein said signal processing means provides said modulation signal and demodulates said detector output signal as a function of said modulation signal so as to derive said signal indicative of the rotation rate.

* * * * *